(12) United States Patent
Jiang et al.

(10) Patent No.: US 12,158,385 B2
(45) Date of Patent: Dec. 3, 2024

(54) ANTI-OVERLOAD TORQUE SENSOR BASED ON THIN FILM SPUTTERING

(71) Applicant: SHAANXI ELECTRIC APPLIANCE RESEARCH INSTITUTE, Xi'an (CN)

(72) Inventors: Xin Jiang, Xi'an (CN); Bo Gao, Xi'an (CN); Wenxuan Qu, Xi'an (CN); Ting Pan, Xi'an (CN); Lu Lin, Xi'an (CN)

(73) Assignee: Shaanxi Electric Appliance Research Institute, Xi'an (CN)

( * ) Notice: Subject to any disclaimer, the term of this patent is extended or adjusted under 35 U.S.C. 154(b) by 236 days.

(21) Appl. No.: 17/714,078

(22) Filed: Apr. 5, 2022

(65) Prior Publication Data
US 2022/0299389 A1    Sep. 22, 2022

Related U.S. Application Data

(63) Continuation of application No. PCT/CN2021/129669, filed on Nov. 10, 2021.

(30) Foreign Application Priority Data

Dec. 21, 2020  (CN) .......................... 202011519048.5

(51) Int. Cl.
    *G01L 3/10*    (2006.01)
(52) U.S. Cl.
    CPC .................... *G01L 3/108* (2013.01)
(58) Field of Classification Search
    CPC ....... G01L 1/18; G01L 1/2237; G01L 1/2231; G01L 1/2287; G01L 1/26
    See application file for complete search history.

(56) References Cited

U.S. PATENT DOCUMENTS

| | | | | |
|---|---|---|---|---|
| 5,526,700 | A * | 6/1996 | Akeel | G01L 1/18 73/862.042 |
| 6,324,919 | B1 * | 12/2001 | Larsen | G01L 5/1627 73/862.043 |
| 6,484,593 | B2 * | 11/2002 | Lehtovaara | G01L 5/10 73/862.637 |
| 7,458,281 | B2 * | 12/2008 | Ohsato | G01L 5/162 73/862.041 |
| 7,490,524 | B2 * | 2/2009 | Ohsato | G01L 5/162 73/862.629 |
| 8,080,869 | B2 * | 12/2011 | Okudo | G01P 1/023 257/E23.193 |
| 8,418,558 | B2 * | 4/2013 | Kazama | G01P 15/18 73/514.33 |
| 9,011,013 | B2 * | 4/2015 | Norimatsu | F16C 19/522 73/862.045 |
| 10,352,793 | B2 * | 7/2019 | Nitz | B25J 13/085 |

(Continued)

*Primary Examiner* — Tran M. Tran
(74) *Attorney, Agent, or Firm* — Yong Chen (57) ABSTRACT

An anti-overload torque sensor based on thin film sputtering includes an output cable, a circuit board, a cushion column, a shell, an elastic body, strain beams and thin film strain gauges. The elastic body is sequentially divided into an inner edge section, a mounting ring section and an outer edge section from inside to outside, and the mounting ring section is provided with integrally formed rectangular protrusions as the strain beams. The shell is coaxially installed on the mounting ring section of the elastic body. Strain resistors of the thin film strain gauges are sputtered on the strain beams of the elastic body by the sputtering coating technology.

5 Claims, 5 Drawing Sheets

(56) References Cited

U.S. PATENT DOCUMENTS

| | | | | |
|---|---|---|---|---|
| 11,137,299 B2* | 10/2021 | Abbasi Gavarti | ..... | H10N 30/03 |
| 11,408,786 B2* | 8/2022 | Endo | ........................ | G01L 3/108 |
| 11,499,879 B2* | 11/2022 | Endo | ........................ | H01L 29/84 |
| 11,650,113 B2* | 5/2023 | Xu | ........................... | G01L 3/108 |
| | | | | 73/862.338 |
| 11,788,906 B2* | 10/2023 | Kosaka | ................. | G01L 1/2262 |
| | | | | 73/782 |
| 11,841,286 B2* | 12/2023 | Okuma | ................. | G01L 3/1421 |
| 11,892,364 B2* | 2/2024 | Thurman | ............... | G01L 5/1627 |
| 2013/0283914 A1* | 10/2013 | Imanaka | ................. | G01P 21/00 |
| | | | | 73/514.36 |
| 2019/0275681 A1* | 9/2019 | Böhme | ................. | B25J 13/085 |
| 2020/0370978 A1* | 11/2020 | Yokoyama | .............. | G01L 3/108 |
| 2023/0010885 A1* | 1/2023 | Miyashita | ............... | G01L 1/2206 |
| 2023/0273078 A1* | 8/2023 | Miyashita | ................. | G01L 5/24 |

\* cited by examiner

ANTI-OVERLOAD TORQUE SENSOR BASED ON THIN FILM SPUTTERING

TECHNICAL FIELD

The present disclosure relates to the technical field of electronic sensing and weighing devices, and particularly relates to an anti-overload torque sensor based on thin film sputtering.

BACKGROUND

The purpose of the torque sensor is to measure the one-dimensional torque physical quantity. The resistance strain sensor is the most used torque sensor at home and abroad at present. It uses the traditional method of sticking the strain gauge on the surface of the elastic beam. When physical quantities such as the torque act on the elastic beam, it will lead to the change of stress and strain of components, and then cause the change of resistance of the resistance strain gauge. After being processed by a circuit, the change of resistance is output in the form of an electrical signal. This kind of sensor is widely used in torque measurement.

However, at present, well-known torque sensors mostly adopt the traditional strain gauge sticking method, the traditional strain gauge is short in service life, and low in stability, accuracy, dynamic response and anti-vibration ability, and the temperature range of the traditional strain gauge is −30 DEG C.-100 DEG C., which is too narrow to meet the use requirements.

At present, the known overload requirement of the torque sensors is mostly one-time overload. When the service condition of the sensor is five-time overload or even higher, the elastic beam of the sensor will reach the yield limit of the material itself and fail, which leads to the failure of the sensor. Therefore, the use requirements cannot be met.

SUMMARY

In view of the above, the present disclosure provides an anti-overload torque sensor based on thin film sputtering. A sensitive film is prepared by a sputtering coating process and an anti-torsion limiting structure is provided, when the torque load exceeds a set threshold value, the anti-torsion limiting structure can play the anti-overload role to protect the elastic beams.

The disclosure is implemented by the following technical solution:

An anti-overload torque sensor based on thin film sputtering, including: an output cable, a circuit board, a cushion column, a shell, an elastic body, strain beams and film strain gauges; wherein the shell is an annular shell;
the elastic body is an annular plate, which is sequentially divided into three coaxial annular structures from inside to outside: an inner edge section, a mounting ring section and an outer edge section; two opposite annular gaps are processed between the inner edge section and the mounting ring section, and the two annular gaps are respectively a first annular gap and a second annular gap; two ends of each annular gap are provided with outward extending linear gaps, the two linear gaps of the first annular gap are one-to-one opposite and parallel to the two linear gaps of the second annular gap to form two linear gap groups, wherein a C-shaped convex gap is processed in the middle of the first annular gap as an anti-torsion limiting structure; a rectangular protrusion integrally formed with the elastic body is arranged between the two linear gaps of each linear gap group as a strain beam, and the two strain beams are located on the mounting ring section of the elastic body; and if an axis of symmetry perpendicular to the width direction of each strain beam is an axis of symmetry A, the axes of symmetry A of the two strain beams coincide;
the thin film strain gauge includes four strain resistors;
the integral connection relationship is as follows: the shell is coaxially mounted on the mounting ring section of the elastic body; the circuit board is located in an annular cavity of the shell and is mounted on the mounting ring section of the elastic body through the cushion column; one end of the output cable is welded on the circuit board, and the other end is connected with an external electrical connector;
the two thin film strain gauges are respectively arranged on the two strain beams; the four strain resistors of each thin film strain gauge are sputtered on the corresponding strain beam by the sputtering coating technology, and the four strain resistors are symmetrically distributed in pairs along the axis of symmetry A;
wherein, the two thin film strain gauges are a thin film strain gauge A and a thin film strain gauge B respectively, and the four strain resistors of the thin film strain gauge A are a resistor R1-1, a resistor R2-3, a resistor R1-4 and a resistor R2-2 respectively, and the resistor R1-1 and the resistor R1-4 are diagonally distributed, and the resistor R2-3 and the resistor R2-2 are diagonally distributed; the four strain resistors of the thin film strain gauge B are a resistor R1-3, a resistor R2-1, a resistor R1-2 and a resistor R2-4 respectively, and the resistor R1-3 and the resistor R1-2 are diagonally distributed, and the resistor R2-1 and the resistor R2-4 are diagonally distributed;
the circuit board is a group bridge circuit board which forms a main Wheatstone bridge with the resistor R1-1, the resistor R1-4, the resistor R1-3 and the resistor R1-2 respectively, and forms a standby Wheatstone bridge with the resistor R2-3, the resistor R2-2, the resistor R2-1 and the resistor R2-4 respectively; and
the circuit board is connected with the output cable, supplies power to the main Wheatstone bridge and the standby Wheatstone bridge through the output cable, and outputs electrical signals of the main Wheatstone bridge and the standby Wheatstone bridge through the output cable.

Further, an included angle between the axis of symmetry of each strain resistor and the axis of symmetry A of the strain beam is 45 degrees.

Further, both the main Wheatstone bridge and the standby Wheatstone bridge are full-bridge equal-arm bridges.

Further, through holes are processed on the inner and outer edge sections of the elastic body.

Further, the anti-overload torque sensor based on thin film sputtering further includes an upper cover plate;
the upper end of the shell is open, and a connecting rod is installed at the lower end to connect an inner cylinder and an outer cylinder of the annular shell into a whole; and
the upper cover plate is installed on the upper end of the shell and closes the opening of the shell.

Beneficial Effects (1) Each of the strain resistors of the thin film strain gauge of the disclosure is a sensitive film made by the sputtering coating process, the principle of which is that the nano-film is directly prepared on the substrate by using the low-energy accelerator bombardment, kinetic energy conversion and migrated atom film deposition technology. By controlling the thickness of a single-layer film, the internal stresses of two films are well matched, so that the strain resistor has the characteristics of small internal stress, strong adhesion, high insulation strength and good compactness. Therefore, compared with the traditional strain gauge, the thin strain gauge has the characteristics of long service life, good stability, high precision, strong dynamic response and the like, and the thin film strain gauge can adapt to the temperature range of −70 DEG C.-200 DEG C., and compared with the temperature range of −30 DEG C.-100 DEG C. of the traditional strain gauge, the disclosure can adapt to a wider temperature range.

(2) The elastic body of the present disclosure is provided with an anti-torsion limiting structure, when the torque load exceeds a set threshold, the two side edges of the corner of the anti-torsion limiting structure, that is, the C-shaped convex gap, are in contact with each other, so that the inner edge section of the elastic body is no longer twisted relative to the outer edge section, and the torsion of the inner edge section of the elastic body is limited, the structure plays an overload protection role to prevent the inner edge section of the elastic body from being damaged due to excessive torsion, and protects the elastic beams. Moreover, the anti-torsion limiting structure of the disclosure has anti-overload protection for both positive torque and negative torque.

(3) The invention can change the C-shaped size of the C-shaped convex gap according to the set threshold value, and then adjust the travel distance of the torsion of the inner edge section of the elastic body relative to the outer edge section, so as to meet the use requirements of sensors with different anti-overload requirements.

(4) The Wheatstone bridge of the invention adopts a full-bridge equal-arm bridge, which has the highest sensitivity, the parameters of each arm of the equal-arm bridge are consistent, and the influences of various interferences are easy to cancel each other, thereby ensuring the accuracy of the whole machine.

wherein, 1—output cable, 2—upper cover plate, 3—circuit board, 4—cushion column, 5—shell, 6—elastic body, 7—strain beam, 8—film strain gauge, 9—C-shaped convex gap.

DETAILED DESCRIPTION

The present invention is described in detail with reference to the accompanying drawings and embodiments.

Figure 1:
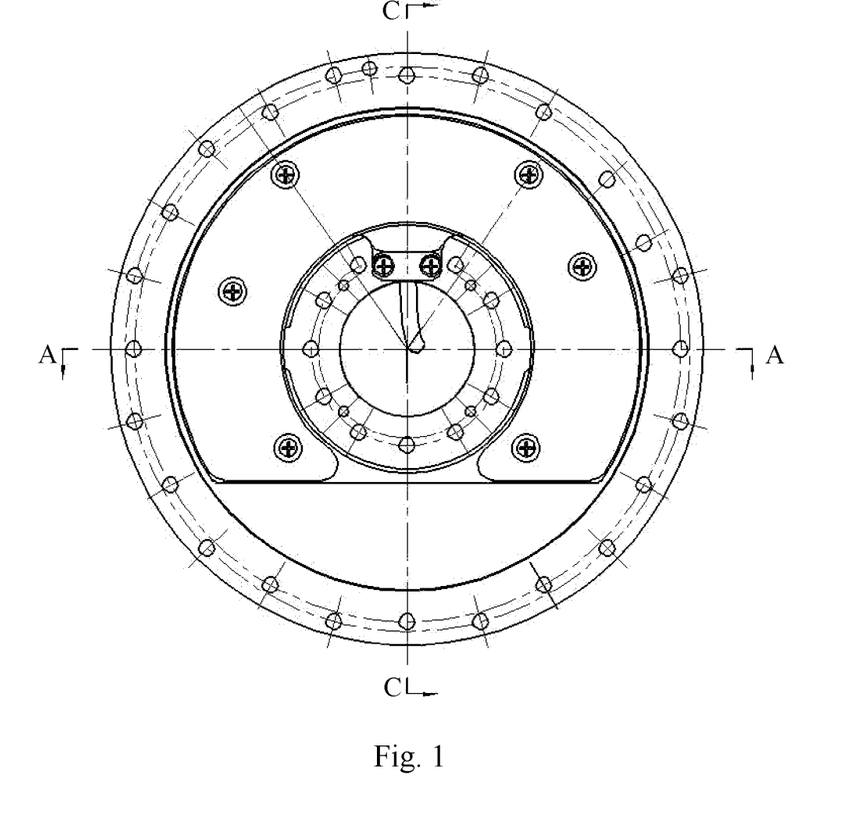
FIG. 1 is a structural composition diagram of the present invention.
Figure 2:
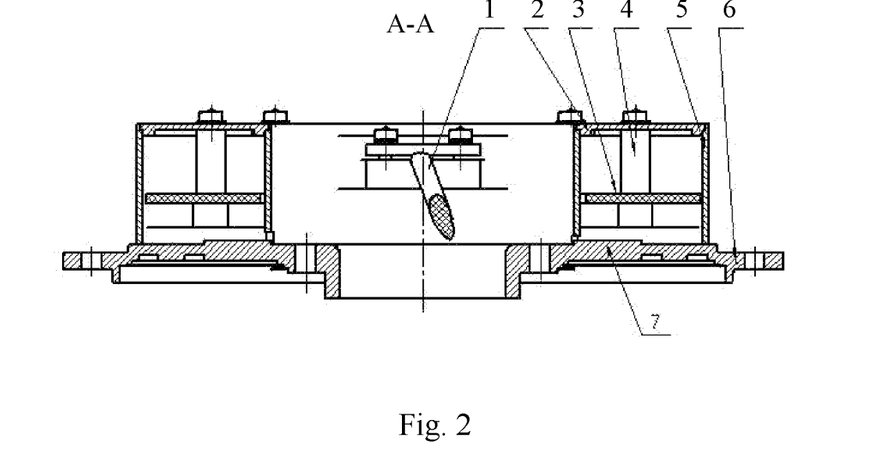
FIG. 2 is an A-A cross-sectional view of FIG. 1.
Figure 3:
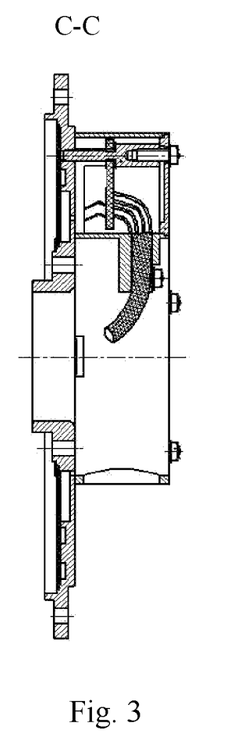
FIG. 3 is a C-C cross-sectional view of FIG. 1.
Figure 4:
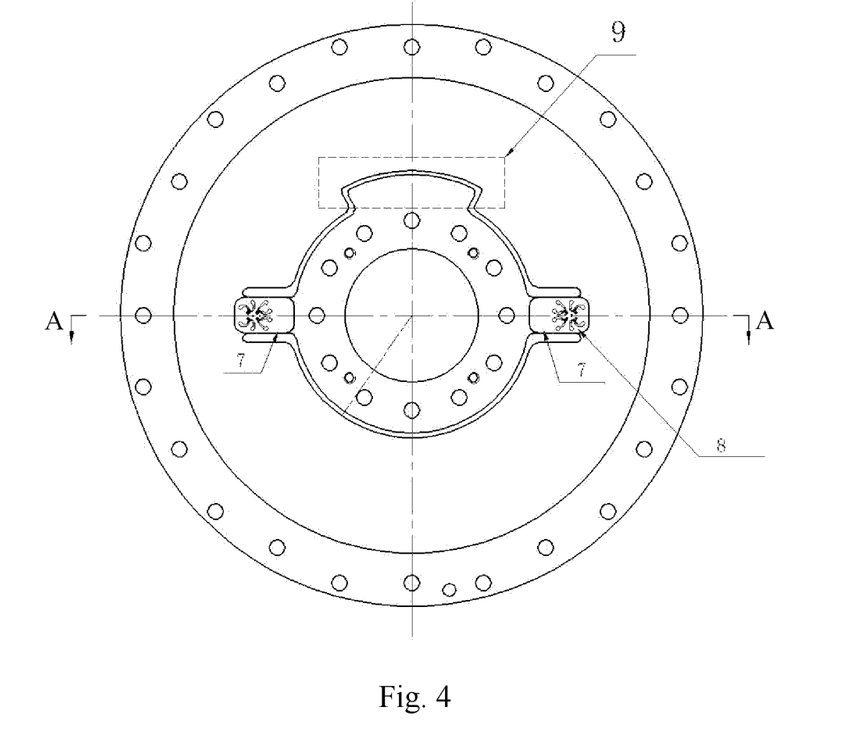
FIG. 4 is a composition diagram of the elastic body, the strain beams and the film strain gauges.
Figure 5:
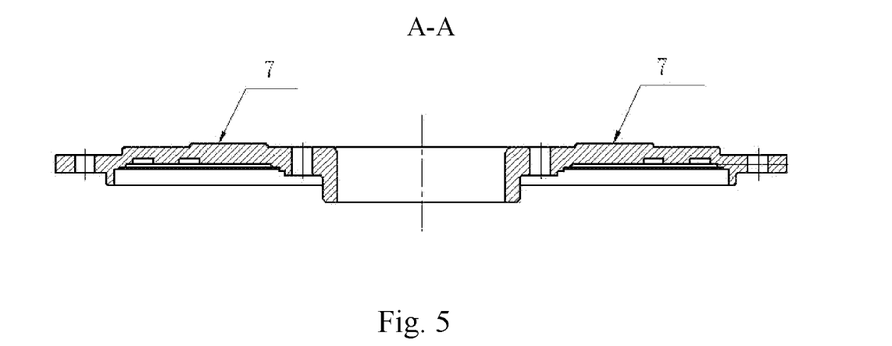
FIG. 5 is an A-A cross-sectional view of FIG. 4.
Figure 6:
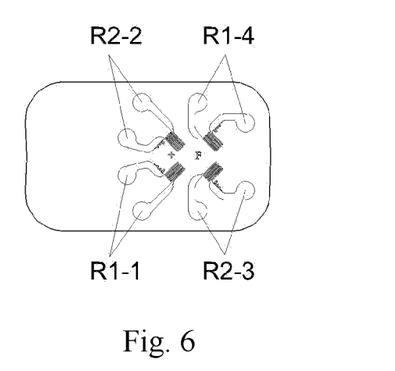
FIG. 6 is a schematic diagram of installation of four strain resistors of the thin film strain gauge A.
Figure 7:
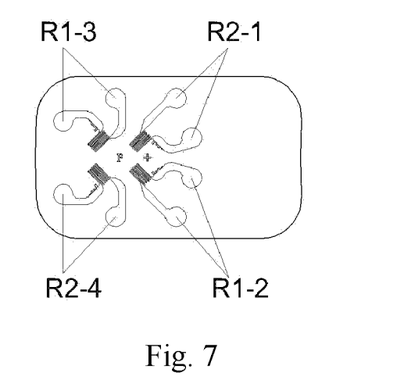
FIG. 7 is a schematic diagram of installation of four strain resistors of the thin film strain gauge B.

The embodiment provides an anti-overload torque sensor based on thin film sputtering. Referring to FIG. 1-3, the sensor includes: an output cable 1, an upper cover plate 2, a circuit board 3, a cushion column 4, a shell 5, an elastic body 6, strain beams 7 and thin film strain gauges 8;

the shell 5 is an annular shell, the upper end of the shell is open, and a connecting rod is installed at the lower end to connect an inner cylinder and an outer cylinder of the annular shell into a whole; in the embodiment, the shell 5 is a C-shaped shell which is left after being truncated by a plane parallel to its axis, and the space formed by the truncated portion is used for mounting an external part;

Referring to FIG. 4-5, the elastic body 6 is an annular plate, which is sequentially divided into three coaxial annular structures from inside to outside: an inner edge section, a mounting ring section and an outer edge section; two opposite annular gaps are processed between the inner edge section and the mounting ring section, and the two annular gaps are respectively a first annular gap and a second annular gap; two ends of each annular gap are provided with outward extending linear gaps, the two linear gaps of the first annular gap are one-to-one opposite and parallel to the two linear gaps of the second annular gap to form two linear gap groups, wherein a C-shaped convex gap 9 is processed in the middle of the first annular gap as an anti-torsion limiting structure; through holes are processed on the inner and outer edge sections to mount the sensor on the external part; a rectangular protrusion integrally formed with the elastic body 6 is arranged between the two linear gaps of each linear gap group as a strain beam 7, and the two strain beams 7 are located on the mounting ring section of the elastic body 6; and if an axis of symmetry perpendicular to the width direction of each strain beam 7 is an axis of symmetry A, the axes of symmetry A of the two strain beams 7 coincide;

The thin film strain gauge 8 includes four strain resistors;

The integral connection relationship is as follows: the upper cover plate 2 is mounted on the upper end of the shell 5 through screws to close the opening of the shell 5;

The lower end of the shell 5 is mounted coaxially on the mounting ring section of the elastic body 6;

The circuit board 3 is located in an annular cavity of the shell 5 and is mounted on the mounting ring section of the elastic body 6 through the cushion column 4;

One end of the output cable 1 is welded on the circuit board 3, and the other end is connected with an external electrical connector;

The two thin film strain gauges 8 are respectively arranged on the two strain beams 7; the four strain resistors of each thin film strain gauge 8 are sputtered on the corresponding strain beam 7 by sputtering coating to form sensitive films, since the axis of symmetry A of the strain beam 7 is the strain maximum region, therefore, the four strain resistors are symmetrically distributed in pairs along the axis of symmetry A, and an included angle between the axis of symmetry of each strain resistor and the axis of symmetry A of the strain beam 7 is 45 degrees;

Wherein, referring to FIGS. 6-7, the two thin film strain gauges 8 are a thin film strain gauge A and a thin film strain gauge B respectively, and the four strain resistors of the thin film strain gauge A are a resistor R1-1, a resistor R2-3, a resistor R1-4 and a resistor R2-2 respectively, and the resistor R1-1 and the resistor R1-4 are diagonally distributed, and the resistor R2-3 and the resistor R2-2 are diagonally distributed; the four strain resistors of the thin film strain gauge B are a resistor R1-3, a resistor R2-1, a resistor R1-2 and a resistor R2-4 respectively, and the resistor R1-3 and the resistor R1-2 are diagonally distributed, and the resistor R2-1 and the resistor R2-4 are diagonally distributed;

The circuit board 3 is a group bridge circuit board which forms a main Wheatstone bridge with the resistor R1-1, the resistor R1-4, the resistor R1-3 and the resistor R1-2 respectively, and forms a standby Wheatstone bridge with the resistor R2-3, the resistor R2-2, the resistor R2-1 and the resistor R2-4 respectively, i.e., two Wheatstone bridge circuits are formed, and both the main Wheatstone bridge and the standby Wheatstone bridge are full-bridge equal-arm bridges; and The circuit board 3 is connected with the output cable 1, supplies power to the main Wheatstone bridge and the standby Wheatstone bridge through the output cable 1, and outputs electrical signals of the main Wheatstone bridge and the standby Wheatstone bridge through the output cable 1.

Working principle: when the sensor is subjected to a positive or negative torque load, that is, when a torque load is applied to the outer edge section or the inner edge section of the elastic body 6, due to the existence of the annular gap, the inner edge section and the outer edge section of the elastic body 6 are relatively deformed, the outer edge section of the elastic body 6 is fixed, the inner edge section of the elastic body 6 is twisted relative to the outer edge section, thereby driving the strain beam 7 installed between the inner edge section and the mounting ring section to deform, and furthermore, causing the strain resistor of the thin film strain gauge 8 on the strain beam 7 to be deformed, resulting in a change in the resistance value, which leads to a change in voltage output by the main Wheatstone bridge and the standby Wheatstone bridge. According to the change in voltage, the magnitude of the torque load can be calculated.

Figure 8:
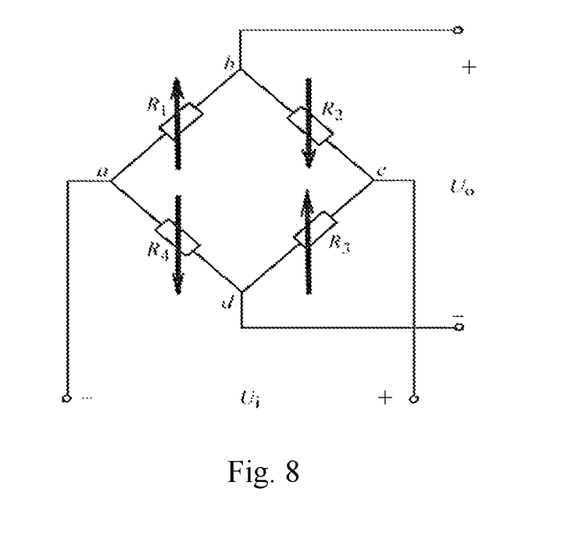
FIG. 8 is a working schematic diagram of the Wheatstone bridge.

Wherein, when the torque load reaches a set threshold value, the two side edges of the corner of the C-shaped convex gap of the first annular gap are in contact with each other, so that the inner edge section of the elastic body 6 is no longer twisted relative to the outer edge section, and the torsion of the inner edge section of the elastic body 6 is limited, the C-shaped convex gap plays an overload protection role to prevent the inner edge section of the elastic body 6 from being damaged due to excessive torsion;

Referring to the FIG. 8, the principle of the Wheatstone bridge is as follows:

The four resistors of the Wheatstone bridge are divided into four bridge arms, which are R1, R2, R3 and R4 respectively. R1, R2, R3 and R4 are connected in sequence to form a closed loop, the connection point between R1 and R4 is an a point, the connection point between R1 and R2 is a b point, the connection point between R2 and R3 is a c point, and the connection point between R3 and R4 is a d point; the diagonal a and c are bridge supply terminals and the b and d are output terminals; when the resistance values of all the four bridge arms change, the bridge is called a full bridge type, and the embodiment adopts a full bridge type equal-arm bridge;

After a power supply voltage $U_i$ is applied to the bridge supply terminals through the circuit board 3, the output terminals generate an output voltage $U_0$, and the output voltage $U_0$ is output through the output cable 1; and when the sensor is subjected to a torque load, the resistance value of the bridge arm changes, and the output voltage $U_0$ of the output terminals has a corresponding change, the formula of the output voltage $U_0$ is:

$$U_0 = \frac{U_i}{4}\left(\frac{\Delta R_1}{R_1} - \frac{\Delta R_2}{R_2} + \frac{\Delta R_3}{R_3} - \frac{\Delta R_4}{R_4}\right)$$

Wherein, $R_1$ is the resistance value of R1, $\Delta R_1$ is the resistance change value of R1, $R_2$ is the resistance value of R2, $\Delta R_2$ is the resistance change value of R2, $R_3$ is the resistance value of R3, $\Delta R_3$ is the resistance change value of R3, and $R_4$ is the resistance value of R4, $\Delta R_4$ is the resistance change value of R4.

The manufacturing steps of the sensor are as follows:

Step 1, after cleaning, grinding and polishing, film deposition, strain pattern making, film stabilization heat treatment, pad making and other technological steps on the surface of the mounting ring section of the elastic body 6, sputtering the strain resistor of the film strain gauge 8 on the surface of the strain beam 7 of the elastic body 6;

Step 2, mounting the elastic body 6 at the lower end of the shell 5, mounting the circuit board 3 in the shell 5, fixing the circuit board 3 on the elastic body 6 through the cushion column 4, and fixing the upper cover plate 2 at the upper end of the shell 5 through screws; and Step 3: welding one end of the output cable 1 to the circuit board 3, and the other end to the electrical connector as required.

To sum up, the above is only a preferred embodiment of the present invention, and is not intended to limit the scope of protection of the present invention. Any modifications, equivalents, modifications, etc. made within the spirit and principles of the present invention shall be included within the scope of protection of the present invention.

What is claimed is:

1. An anti-overload torque sensor based on thin film sputtering, comprising: an output cable (1), a circuit board (3), a cushion column (4), a shell (5), an elastic body (6), two strain beams (7) and two film strain gauges (8); wherein:
   the shell (5) is an annular shell;
   the elastic body (6) is an annular plate, which is divided into three coaxial annular structures: an inner edge section, an outer edge section, and a mounting ring section disposed between the inner edge section and the outer edge section; two opposite annular gaps are disposed between the inner edge section and the mounting ring section, and the two annular gaps are respectively a first annular gap and a second annular gap; two ends of each annular gap are provided with outward extending linear gaps, the two linear gaps of the first annular gap are one-to-one opposite and parallel to the two linear gaps of the second annular gap to form two linear gap groups, wherein a C-shaped convex gap (9) is disposed in the first annular gap as an anti-torsion limiting structure;
   wherein the two strain beams (7) are each integrally formed by a rectangular protrusion with the elastic body (6) arranged between the two linear gaps of each linear gap group, and are located on the mounting ring section of the elastic body (6); and wherein an axis of symmetry perpendicular to a width direction of each strain beam defines an axis of symmetry A of that strain beam, and the axes of symmetry A of the two strain beams coincide;
   and wherein the shell (5) is coaxially mounted on the mounting ring section of the elastic body (6); the circuit board (3) is located in an annular cavity of the shell (5) and is mounted on the mounting ring section of the elastic body (6) through the cushion column (4); one end of the output cable (1) is welded on the circuit board (3), and the other end is connected with an external electrical connector;

wherein the two thin film strain gauges (8) are respectively arranged on the two strain beams (7);

wherein the two thin film strain gauges (8) include a thin film strain gauge A and a thin film strain gauge B respectively, and the four strain resistors of the thin film strain gauge A include a resistor R1-1, a resistor R2-3, a resistor R1-4 and a resistor R2-2 respectively, and the resistor R1-1 and the resistor R1-4 are diagonally distributed, and the resistor R2-3 and the resistor R2-2 are diagonally distributed;

the four strain resistors of the thin film strain gauge B include a resistor R1-3, a resistor R2-1, a resistor R1-2 and a resistor R2-4 respectively, and the resistor R1-3 and the resistor R1-2 are diagonally distributed, and the resistor R2-1 and the resistor R2-4 are diagonally distributed;

wherein the four strain resistors of each of thin film strain gauge A and thin film strain gauge B are sputtered on a corresponding strain beam (7) by sputtering coating, and are symmetrically distributed in pairs (R1-4, R2-3), (R2-2, R1-1), (R2-1, R1-2), and (R1-3, R2-4) along the axis of symmetry A, the circuit board (3) is a group bridge circuit board which forms a main Wheatstone bridge with the resistor R1-1, the resistor R1-4, the resistor R1-3 and the resistor R1-2 respectively, and forms a standby Wheatstone bridge with the resistor R2-3, the resistor R2-2, the resistor R2-1 and the resistor R2-4 respectively; and the circuit board (3) is connected with the output cable (1), supplies power to the main Wheatstone bridge and the standby Wheatstone bridge through the output cable (1), and outputs electrical signals of the main Wheatstone bridge and the standby Wheatstone bridge through the output cable (1).

2. The anti-overload torque sensor according to claim 1, wherein an included angle between the axis of symmetry of each strain resistor and the axis of symmetry A of the strain beam (7) is 45 degrees.

3. The anti-overload torque sensor based on thin film sputtering according to claim 1, wherein both the main Wheatstone bridge and the standby Wheatstone bridge are full-bridge equal-arm bridges.

4. The anti-overload torque sensor according to claim 1, wherein the inner and outer edge sections of the elastic body (6) both comprise through holes.

5. The anti-overload torque sensor according to claim 1, further comprising an upper cover plate (2), wherein:

the upper end of the shell (5) is open, and a connecting rod is installed at the lower end to connect an inner cylinder and an outer cylinder of the annular shell into a whole; and the upper cover plate (2) is installed on the upper end of the shell (3) and closes the opening of the shell (3).

* * * * *